United States Patent [19]

Etzel

[11] Patent Number: 4,978,974
[45] Date of Patent: Dec. 18, 1990

[54] IMAGE RECORDER WITH LINEAR LASER DIODE ARRAY

[75] Inventor: Mark R. Etzel, Madison, Wis.
[73] Assignee: Polaroid Corporation, Cambridge, Mass.
[21] Appl. No.: 401,160
[22] Filed: Aug. 30, 1989
[51] Int. Cl.$^5$ .......................... G01D 15/16; B41J 2/44
[52] U.S. Cl. .................. 346/107 R; 346/108
[58] Field of Search ............... 346/76 PH, 76 L, 108, 346/107 R, 160; 355/202

[56] References Cited

U.S. PATENT DOCUMENTS 4,318,597  3/1982  Kotani et al. ............... 346/107 R
4,553,833  11/1985  Kanooka et al. ............ 346/107 R Primary Examiner—Mark J. Reinhart
Attorney, Agent, or Firm—Karl Hormann

[57] ABSTRACT

An imaging recorder wherein a linear array of laser diodes is mounted to project the output of the diodes onto a thermally activated photosensitive material movable along a predetermined path. The array of diodes is linearly aligned in a direction parallel to the path of movement of the material and the laser diodes are activated simultaneously as a group. Optical means are provided between the array of laser diodes and the material to provide an imaging spot on the material which is elongated in a direction perpendicular to the path of movement of the material.

10 Claims, 2 Drawing Sheets

IMAGE RECORDER WITH LINEAR LASER DIODE ARRAY

BACKGROUND OF THE INVENTION

The present invention is directed to imaging recorders and more particularly to an imaging recorder device wherein images are produced by the application of heat patterns to a thermal imaging material.

The employment of a thermal imaging medium to provide stable images of high quality is known to have a potentially wide range of applications, and various devices providing for the application of heat to such imaging materials have been proposed. One source of heat which has now become somewhat conventional for exposing thermal imaging media are lasers chosen of sufficient power output, and appropriately modulated while scanning a medium in an image pattern. One advantage to the employment of such laser devices is that the time required for irradiating the imaging material in this manner is relatively short in comparison with other heat sources such as Xenon flash tubes.

A typical thermal imaging medium employing laser diodes for irradiation is disclosed in International Application PCT/US87/03249.

In applying the image upon a medium disclosed in the aforementioned application, the diodes are conventionally mounted such that the light radiating elements are linearly arranged in a direction perpendicular to the path of movement of the material and an optical means is disposed between the light radiating elements and the path of the material for converting the image of the light radiating elements on the material to an irradiated region which is elongated in a direction perpendicular to the movement of the medium, or in the instance where the medium is mounted on a drum, in the axial direction of the drum.

In this prior arrangement, each of the adjacent elements of the linear laser array exposes corresponding adjacent traces on the imaging medium as it is moved past the focused lasers producing the spot on the imaging medium.

If each of the laser elements in the writing spot is more powerful than the medium exposure threshold, then the medium is exposed over the entire spot during the imaging process.

While the above-described laser scanning configuration is successful in producing satisfactory images on the imaging medium, a problem exists when the power output of the laser elements differ. In order completely to expose the medium, the laser power of all the elements must be increased so that the weakest element is above the medium exposure threshold. In the best case, the weakest element is typically half the average element power and therefore the average element power needs to be twice the medium threshold power in order to insure proper exposure by the weakest element. The result of this is generally a waste of half the total laser power.

In another instance, one or two elements may burn out, even though the total laser power is correct. In this case, increasing the total laser power will not expose all the tracks of the medium and the printer will fail to print acceptable images. Element burn out is a common problem and laser manufacturers often will not specify the number of emitting elements but the total diode output instead.

In view of the above, an object of the present invention is to provide an imaging recorder employing a plurality of light radiating elements which is effective to minimize the power requirements to operate the recorder.

Another object of the invention is to provide an imaging recorder employing a plurality of light radiating elements which is effective to produce acceptable images should one or more of the elements fail to operate.

A further object of the invention is to provide an imaging recorder employing a plurality of light radiating elements wherein the above objectives are achieved employing a structure which is simple in construction and economically produced.

SUMMARY OF THE INVENTION

The above objects and other objects, which will become apparent as the description proceeds, are achieved by providing an imaging recorder device wherein images are produced by the application of patterns to an imaging material, comprising means for moving the imaging material along a predetermined path and a plurality of light radiating elements in spaced relation with the path of the material and disposed to project their output toward the path of the material. Means is provided for applying power simultaneously to the plurality of light radiating elements as a group to heat the thermal imaging material. The light radiating elements are linearly arranged in a direction parallel to the path of movement of the material and an optical means is disposed between the light radiating elements and the path of the material for converting the image of the light radiating elements on the material to an irradiate region which is elongated in a direction perpendicular to the movement of the material.

The means for moving the imaging material generally comprises a rotating drum having the material disposed thereon, the material being a thermally activated sheet material.

The light radiating elements are generally in the form of laser diode elements and may be substantially at least 10 in number to provide the desired spot on the imaging material.

In a more detailed sense, the optical means may comprise a pair of spaced spherical lenses having a cylindrical lens disposed therebetween to collimate the output of the light radiating elements in the lateral direction, perpendicular to the movement of the material.

BRIEF DESCRIPTION OF THE DRAWING

The foregoing and other features of the invention will be more particularly described in connection with the preferred embodiment, and with reference to the accompanying drawing, wherein.

DESCRIPTION OF THE PREFERRED EMBODIMENT

Figure 1:
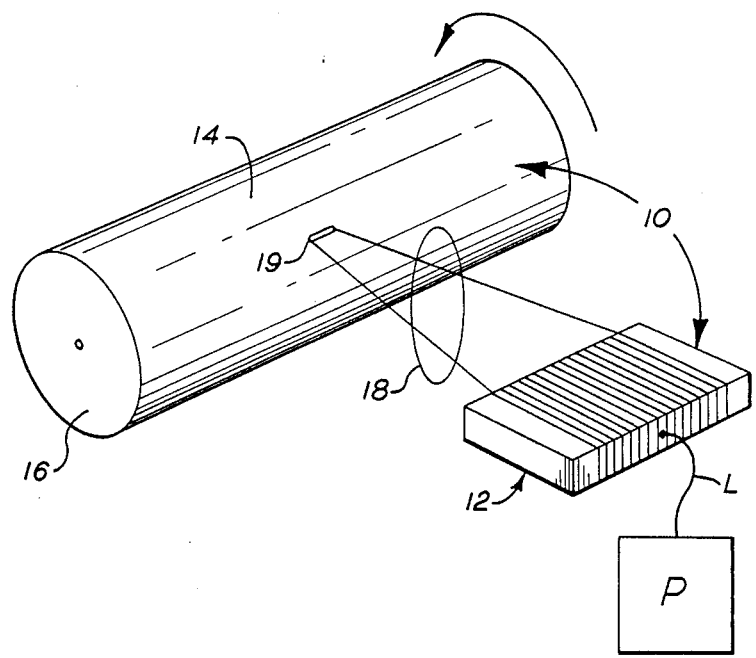
FIG. 1 is a schematic perspective view showing a thermal imaging recorder device of a type found in the prior art.

Referring now to the drawing and in particular to FIG. 1, there is shown an imaging recorder device 10 comprising a plurality of light radiating elements in the form of light array 12 directed toward an imaging material 14 disposed on a drum 16.

A lens system 18 is employed between the light array 12 and the imaging material 14 to produce a focused output having an irradiated region 19 which is wide and narrow measuring about 30×3 μm.

As will be noted, the irradiated region 19, due to the orientation of the light array 12, provides a narrow dimension along the path of movement of the imaging material 14 and a long dimension parallel to the axis of the drum 16. A power source P applies energy to the light array 12 through line L such that the element is energized or de-energized as a unit.

As referred to above, the imaging material 14 is of the type disclosed in International Application PCT/US87/03249, which is therein described as a thermal imaging medium for forming images in response to a brief exposure to intense image forming radiation.

The imaging material is a sheet 14 comprising a support formed of material transparent to the radiation and having an image surface liquefiable and flowable at a selected elevated temperature, a layer of porous or particulate image forming material uniformly coated on the imaging surface and exhibiting a cohesive strength in excess of the adhesive strength between the imaging material and the imaging surface layer. At least one of the materials in confronting portions of the layers is absorptive of the radiation to convert it into thermal energy capable of liquifying the imaging surface of the support, and preferably the material of the imaging surface is such that it liquifies and thereafter solidifies in a substantially short time. The materials of the surface layer, when liquified, exhibit capillary flow into adjacent portions of the imaging material to lock substantially the entire layer of imaging material to the support when the imaging surface layer cools. The imaging material 14 generally has a surface having a narrow temperature range between liquifying and solidifying.

Figure 2:
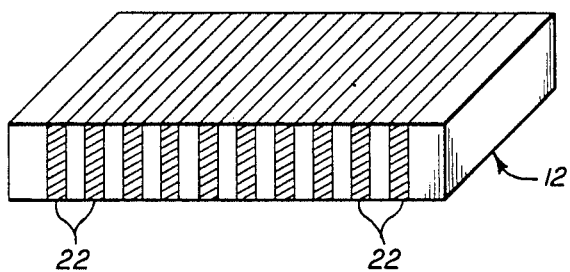
FIG. 2 is a schematic perspective view showing an element of the structure of FIG. 1 taken on an enlarged scale.

Referring to FIG. 2, the light array 12 is shown to be a ten stripe phased array comprising laser diodes 22 which are powered by the power source P. The light array 12 is a 200 mW array wherein the power P is effective to energize the array 12 to simultaneously excite the laser diodes 22 as a group. It should be understood that a plurality of light arrays 12 may be employed in a particular recording device although for the purposes of the present discussion, only one will be shown and described.

With the light array 12 shown in FIG. 2, it is found that the output of the laser diodes 22 are not equal. In order to completely expose the imaging material 14, the power of all the laser diodes 22 must be increased so that the weakest element is above the exposure threshold of the imaging material 14, it has been found that in the best case, the weakest laser diode power output is typically half the average of the laser power and therefore, the average laser power needs to be twice the threshold power of the imaging material 14 in order to insure that the imaging material is exposed by the weakest element. It is therefore evident that a waste of power accompanies the employment of the light array 12 in order to produce an emitting region 19 which will totally expose the imaging material 14 and produce acceptable images. It should also be evident that should a burn out occur of one or more of the laser diodes 22, an increase in total laser power will not expose the tracks of the imaging recorder device 10 and the device will fail to print acceptable images.

Figure 3:
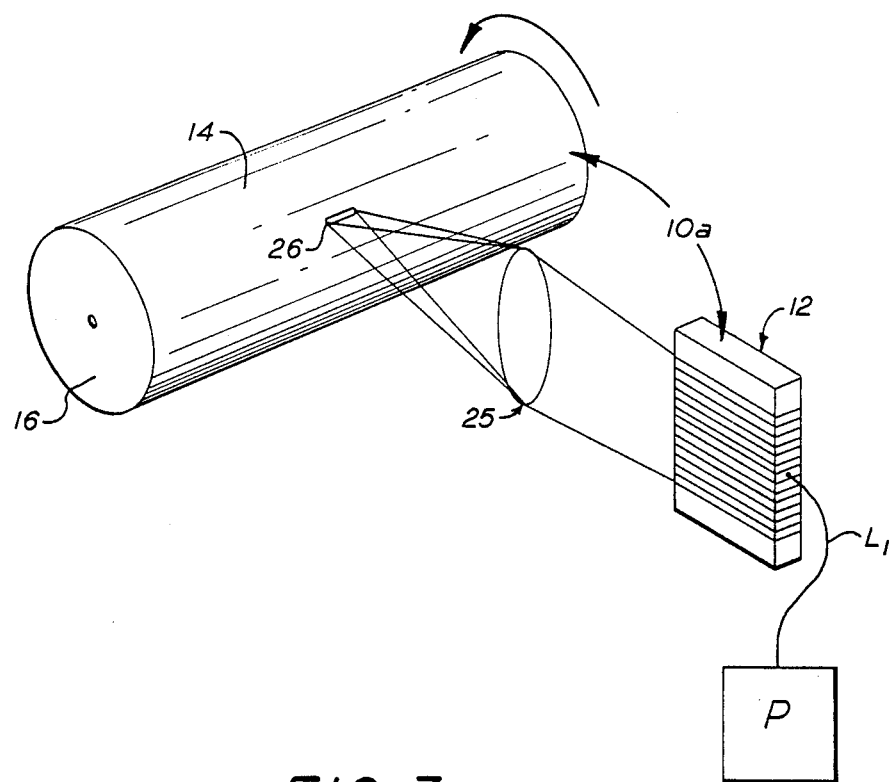
FIG. 3 is a schematic perspective view showing the present invention employed in a thermal imaging recorder device similar to the device of FIG. 1.

Referring now to FIG. 3, an imaging recorder 10a is shown to comprise a light radiating element in the form of light array 12, a drum 16 having imaging material 14 disposed thereon, and a power source P connected to the light array 12 by line L1, similar to the structure shown in FIG. 1. However it will be noted that the light array 12 is rotated through 90° from that shown in FIG. 1 wherein the laser diodes 22 are now arranged in a linear direction parallel to the path of the movement of the imaging material 14, as the drum 16 is rotated. Each of the elements of FIG. 3 thus far described operate similar to the elements of FIG. 1 in that the power source P is connected to the light array 12 such that the laser diodes 22 are simultaneously excited as a group and the light array 12 is disposed to direct its output onto the imaging material 14. As will be noted, in place of the lens 18, optical means in the form of a lens system 25 is disposed between the light array 12 and the surface of the imaging material 14.

The lens system 25 is so designed and constructed that with the light array 12, and the line of laser diodes 22 linearly arranged in a direction parallel to the path of movement of the material, a irradiated region 26 projected onto the imaging material remains elongated in a direction perpendicular to the movement of the imaging material surface. Thus, the irradiated region 26 is similar in dimension to the irradiated region 19, however, the total integrated output of the laser diodes 22, rather than each of the laser diodes separately, determines the exposure of the imaging material on a line running in the direction of the movement of the imaging material. It will therefore be evident that if one or more of the laser diodes 22 in the light array 12 fails to operate at the threshold power of the imaging material 14 or if one of the laser diodes 22 should burn out, proper exposure of the imaging material will take place as long as the total integrated output of the light array exceeds the imaging threshold of the imaging material.

Figure 4A:
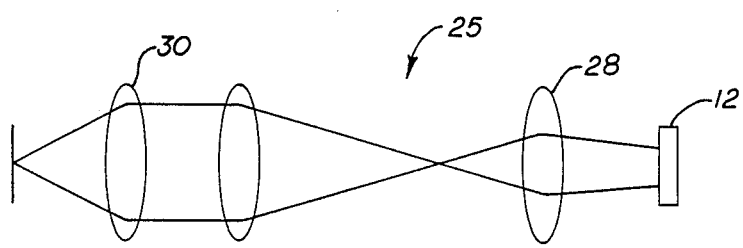
FIGS. 4a and 4b are schematic views taken at right angles to one another showing details of the optical system of FIG. 3.
Figure 4B:
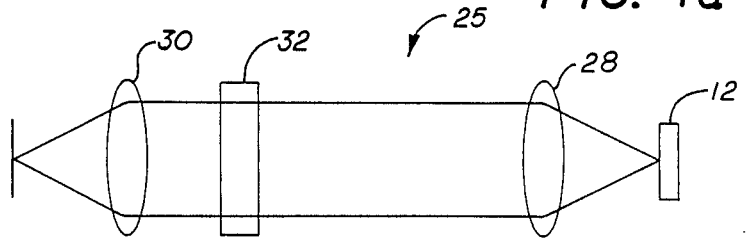

Referring now to FIGS. 4a and 4b, a typical optical system 25 is shown which includes a pair of spaced spherical lenses 28 and 30 having a cylindrical lens 32 disposed therebetween to collimate the output of the light radiating element 12 in the vertical direction, parallel to the movement of the imaging material 14. An optical system 25 may be constructed by employing a spherical 0.65NA, 40x microscope objective lens to collect the laser light and a 0.4NA, 20x microscope objective lens 30 as a means of focus. The cylindrical lens 32 may be a 333 millimeter focal length lens used to collimate the light laterally. It should be evident that various alternative or combinations of lenses 28, 30 and 32 may be employed to achieve the optimum optical efficiency desirable in a particular unit, while achieving the objective of transforming the light array 12, as oriented in FIG. 3, to produce the irradiated region 26 on the surface of the imaging material 14, as shown in that figure.

From the foregoing, it is obvious that the imaging recorder device 10a is not sensitive to either variations in the power of the diode elements 22 or to element burn out, thereby achieving the objectives of the present invention. In addition, the modification to an imaging recorder device 10 as depicted in FIG. 1 is simple in that the reorientation of the light radiating elements 12 and the substitute of the lens system 25 for the lens 18 are substantially the only modifications that need be made to an existing unit.

While it is apparent that changes and modifications may be made within the spirit and scope of the present invention, it is my intention, however, only to be limited by the appended claims.

As my invention, I claim.

1. An imaging recorder device wherein images are produced by the application patterns to an imaging material comprising:

means for moving an imaging material along a predetermined path a plurality of light radiating elements in spaced relation with the path of the material and disposed to project their output toward the path of the material;

means for applying power simultaneously to said plurality of light radiating elements as a group to heat the thermal imaging material, said light radiating elements being linearly arranged in a direction substantially parallel to the path of movement of the material; and optical means disposed between said light radiating elements and the path of the material for converting the image of said light radiating elements on the material to an irradiated region which is elongated in a direction linearly perpendicular to the movement of the material.

2. An imaging recorder device as set forth in claim 1 wherein said means for moving an imaging material comprises a rotating drum having the material disposed thereon.

3. An imaging recorder as set forth in claim 1 wherein said imaging material is a thermally activated sheet material.

4. An imaging recorder as set forth in claim 1 wherein said light radiating elements are diode laser elements.

5. An imaging recorder as set forth in claim 1 wherein said plurality of light radiating elements are substantially at least ten in number.

6. An imaging recorder as set forth in claim 1 wherein said optical means comprises a pair of spaced spherical lenses having a cylindrical lens disposed therebetween to collimate the output of said light radiating elements in the vertical direction, parallel to the movement of the material.

7. An imaging recorder as set forth in claim 2 wherein said imaging material is a thermally activated sheet material.

8. An imaging recorder as set forth in claim 7 wherein said light radiating elements are diode laser elements.

9. An imaging recorder as set forth in claim 8 wherein said plurality of diode laser elements is substantially at least ten in number.

10. An imaging recorder as set forth in claim 9 wherein said optical means comprises a pair of spaced spherical lenses having a cylindrical lens disposed therebetween to collimate the output of said diode laser elements in the vertical direction, parallel to the movement of the material.

* * * * *